United States Patent

Ishiwata et al.

[11] Patent Number: 5,386,323
[45] Date of Patent: Jan. 31, 1995

[54] METHOD AND APPARATUS FOR REPRODUCING INDEPENDENTLY RECORDED MULTI-CHANNEL DIGITAL AUDIO SIGNALS SIMULTANEOUSLY AND IN SYNCHRONIZATION WITH VIDEO SIGNALS

[75] Inventors: Tetsuo Ishiwata, Osaka; Susumu Yamaguchi, Nishinomiya, both of Japan

[73] Assignee: Matsushita Electric Industrial Co., Ltd., Osaka, Japan

[21] Appl. No.: 920,730

[22] Filed: Jul. 28, 1992

[30] Foreign Application Priority Data

Jul. 30, 1991 [JP] Japan .................................. 3-189897

[51] Int. Cl.$^6$ .......................... G11B 5/02; G11B 5/09; H04N 5/78
[52] U.S. Cl. .................................. 360/19.1; 360/27; 360/51
[58] Field of Search ...................... 360/19.1, 8, 27, 51, 360/18, 13; 369/49

[56] References Cited

U.S. PATENT DOCUMENTS

| | | | |
|---|---|---|---|
| 4,772,959 | 9/1988 | Amano et al. | 360/8 |
| 4,819,088 | 4/1989 | Higurashi | 360/19.1 |
| 4,823,207 | 4/1989 | Kobayashi et al. | 360/32 |

FOREIGN PATENT DOCUMENTS

| | | |
|---|---|---|
| 0335273 | 10/1989 | European Pat. Off. . |
| 0395347 | 10/1990 | European Pat. Off. . |
| 62-219205 | 9/1987 | Japan . |

OTHER PUBLICATIONS

"Design Considerations for the D-2 NTSC Composite DVTR" by K. Inagaki; ITEJ Technical Report vol. 11, No. 24, pp. 13–18 (Oct. 1987) (Partial English translation is attached).

"Helical-scan Digital Composite Video Cassette Recording System Using 19mm Magnetic Tape, Format D-2 (NTSC, PAL, PAL-M)"; Draft International Standard: Nov. 18, 1991; pp. 97–102, 113–134.

Primary Examiner—Aristotelis Psitos
Assistant Examiner—Jennifer Pearson
Attorney, Agent, or Firm—Lowe, Price, LeBlanc & Becker

[57] ABSTRACT

Herein disclosed is a method and a system for recording and reproducing digital audio signals which enable simultaneous recording of video signals and audio signals without a synchronous relation, and simultaneous reproducing rerecorded audio signals if a part of channels of the audio signals are rerecorded, since a sample number of the audio signals for each the channel is equal to each other. On rerecording, a modulator 113 demodulates signals and the demodulated signals are separated into audio signals and sample number discriminating signals of the audio signals by a demultiplexor 114. A second counter changes dividing number on the basis of the sample number discriminating signals separated by the demultiplexor 114. A phase comparator 118 compares a phase of a cycle of the second counter 117 and a phase of a video frame cycle. Output signals are limited their band by a low-pass filter 119 and controls an oscillated frequency of a voltage controlled oscillator (VCO) 120. A second switch 106 selects output clock pulses of the VCO so that clock pulses used for A/D conversion are coincided with reproduced clock pulses. A fourth switch 110 selects output signals of a delaying means 115 so that sample number of recorded audio signals and sample number discriminating signals are coincided with reproduced audio signals.

6 Claims, 6 Drawing Sheets

METHOD AND APPARATUS FOR REPRODUCING INDEPENDENTLY RECORDED MULTI-CHANNEL DIGITAL AUDIO SIGNALS SIMULTANEOUSLY AND IN SYNCHRONIZATION WITH VIDEO SIGNALS

BACKGROUND OF THE INVENTION

The present invention relates to a method and a system for recording and reproducing digital audio signals together with video signals on and from a magnetic tape.

PRIOR ART

Significant development has been made in digitization of audio and video equipments in recent years. There are some methods for digitally recording audio signals on a video tape, one of which is, for example, disclosed in a report "Design Considerations for the D-2 NTSC Composite DVTR" by Katsuhiko Inagaki printed in "ITEJ Technical Report Vol. 11, No. 24, P.13 through 18, Vt. 87-30, (Oct. 1987).

Now, a system implementing a conventional method for recording and reproducing digital audio signals will be described, referring to an accompanying drawing.

FIG. 5 shows a block diagram of the above system.

In FIG. 5, reference numeral 500 denotes an analog-to-digital converter (hereinafter, referred as an A/D converter) which converts inputted analog audio signals into digital audio signals using clock pulses supplied by a phase locked loop 501, 501 the phase locked loop (hereinafter, referred as a PLL) which produces clock pulses used to sample the audio signals from horizontal synchronizing signals of video signals and supplies them to both the A/D converter 500 and a first counter 503, 502 an encoder which encodes output signals from the A/D converter, 503 the first counter which divides output clock pulses from the PLL 501, 504 a modulator which modulates output signals from the encoder 502, 505 a demodulator which demodulates input signals from a reproducing amplifier, 506 a decoder for data of digital audio signals which decodes output signals from the demodulator 505, 507 a second counter which divides output clock pulses from the PLL 501, and 508 a digital-to-analog converter (hereinafter, referred as a D/A converter) which converts digital audio signals as output signals from the decoder 506 into analog audio signals.

Next description will be made on operation of the above conventional system.

On recording, the A/D converter converts analog input signals into digital signals, using clock pulses having a sampling frequency produced in synchronization with video signals by the PLL 501 or a frequency of an integral multiple of the sampling frequency. The encoder 502 receives signals of count values from the first counter 503 which counts output clock pulses of the PLL 501 to perform interleaving of digital signals as output signals of the A/D converter 500 or addition of an error correction code. Output signals from the encoder 502 are modulated suitably to the recording process by the modulator 504, then outputted to a recording amplifier (not shown).

On reproduction, reproduced signals from a reproducing amplifier (not shown) are demodulated by the demodulator 505, then converted into analog signals by the D/A converter 508 after applied error correction or deinterleaving by the decoder 506. The second counter 507 which times the processing of the decoder 506 counts output clock pulses of the PLL 501. In the above operation, the audio signals are processed by using clock pulses synchronized with the video signals in the case of both recording and reproducing.

The above system and method has a certain disadvantage such that it is impossible to simultaneously record the digital audio signals having a sampling frequency in nonsynchronization with the video signals and such the video signals (for example, video signals and digital audio signals outputted by a BS tuner).

There is another conventional method for recording and reproducing digital audio signals, disclosed in Japanese Patent Application Laid-Open Publication No. 62-219205 or U.S. Pat. No. 4,819,088 (April 1989, Higurashi). The above second conventional method will be next described, referring to another accompanying drawing.

Referring to FIG. 6, there is shown a block diagram of a system implementing the second conventional method for recording and reproducing digital audio signals.

In FIG. 6, reference numeral 600 denotes a receiver for digital audio interface which performs bi-phase-demodulation on inputted digital audio interface signals to convert them into parallel digital audio signals, 601 an A/D converter which converts inputted analog audio signals into digital audio signals, 602 a first switch which carries out switching between output signals from the digital audio interface receiver 600 and output signals from the A/D converter 601, 603 an encoder which encodes output signals from the first switch 602, 604 a crystal oscillator, 605 a second switch which carries out switching between clock pulses reproduced in the bi-phase-demodulation by the receiver 600 for digital audio interface and output clock pulses of the crystal oscillator 604, 606 a first counter which divides output clock pulses of the second switch 605, 607 a sample number discriminator which discriminates a sample number of audio data recorded in a 1/5 video frame cycle from count values of the first counter 606 and a clock pulse five times that of the video frame clock pulse, 608 a multiplexor which multiplexes digital audio signal data processed by the encoder 603 and output signals of the sample number discriminator 607, 609 a modulator 609 which modulates output signals from the multiplexor 608, 610 a demodulator which demodulates input signals from a reproducing amplifier, 611 a demultiplexor which separates output signals of the demodulator 610 into digital audio signal data and sample number discriminating signals, 612 a decoder which decodes digital audio signal data outputted from the demultiplexor 611, 613 a second counter which divides output clock pulses of the voltage controlled oscillator (hereinafter, referred as a VCO) 616, 614 a phase comparator which compares the phase of load pulses of the second counter 613 and the phase of the clock pulses five times the video frame clock pulses, 615 a low-pass filter which limits the band of output signals of the phase comparator 614, 616 the VCO whose oscillated frequency is controlled by output signals of the low-pass filter 615, 617 a D/A converter which converts output signals of the decoder 612 into analog signals, and 618 a transmitter for digital audio interface which converts output signals of the decoder 612 into digital audio interface signals and transmits them.

Operation of the second conventional system of the above arrangement implementing a conventional method for recording and reproducing digital audio signals, will be described next.

Upon recording, in the case of analog input, the A/D converter 601 converts analog input signals into digital signals, using clock pulses having a sampling frequency or a frequency of an integer multiple of the sampling frequency produced by the crystal oscillator 604. The first switch 602 selects output signals of the A/D converter 601, while the second switch 605 selects output signals of the crystal oscillator 604. In the case of digital input, the digital audio interface receiver 600 performs bi-phase-demodulation on signals bi-phase-modulated and transmitted, and reproduces digital audio signals and clock pulses having a sampling frequency and a frequency of an integer multiple of the sampling frequency. The first switch 602 selects digital audio signals outputted from the digital audio interface receiver 600, while the second switch 605 selects clock pulses outputted from the digital audio interface receiver 600. The encoder 603 receives a count value of the first counter 606 which counts output clock pulses of the second switch 605 to perform interleaving, addition of error correction code and the like on digital signals which are output signals of the second switch 602. The sample number discriminator 607 compares a count value of the first counter 606 with clock pulses five times the video frame clock pulses to determine a sample number of audio signals recorded in a 1/5 video frame cycle and controls loading clearing) of the first counter 606. At the same time, the sample number discriminator 607 outputs sample number discriminating signals to the modulator 609 via the multiplexor 608. The multiplexor 608 multiplexes digital audio signal data processed by the encoder 603 and output signals of the sample number discriminator 607. The modulator 609 operates in the same manner as in the first conventional system.

Upon reproduction, input signals from the reproducing amplifier are demodulated by the demodulator 610 and separated into digital audio signals and sample number discriminating signals by the demultiplexor 611. The separated digital audio signals are applied error correction, deinterleaving and the like by the decoder 612, then outputted to both the D/A converter 617 and the digital audio interface transmitter 618. On the other hand, the separated sample number discriminating signals are fed to the second counter 613. The second counter 613 performs load-control on the basis of the sample number discriminating signals. In other words, the second counter 613 loads zero, after counting up to the sample number of the digital audio signals recorded in a 1/5 frame cycle represented by the sample number discriminating signals. The phase comparator 614 compares the phase of load pulses of the second counter 613 with the phase of the clock pulses five time the video frame clock pulses, and outputs the result to the low-pass filter 615. Signals whose band is limited by the low-pass filter 615 are inputted to the VCO 616 to control oscillated frequency of the VCO 616. By using output clock pulses of the VCO 616, the digital audio interface transmitter 618 converts digital audio signal data outputted from the decoder 612 into digital audio interface signals, and outputs them. On the other hand, the D/A converter 617 converts the digital audio signals outputted from the decoder 612 from a digital form into an analog form, and outputs them by using output clock pulses of the VCO 616.

In the above second conventional system, when a part of channels of the audio signals having been recorded are rerecorded, the clock pulses having the sampling frequency or a frequency of an integer multiple of the sampling frequency, used for the rerecording of the audio signals, does not always coincide with clock pulses obtained by reproducing the audio signals having been recorded and their sample discriminating signals. However, stereo signal processing is the mainstream in the field of home digital audio equipments, so a D/A converter of a stereo type having clock pulses common to the L and R channels is going to be widely employed as the D/A converter 617. In the above second conventional system, since the sample number discriminating signals of each the channel are different from each other, there is, thus, a disadvantage such that it is impossible to simultaneously reproduce the L and R channels when employing a D/A converter of a stereo type.

OBJECT AND SUMMARY OF THE INVENTION

An object of the present invention is to overcome the above disadvantage and, thus, to provide a method and system for recording and reproducing digital audio signals, enabling simultaneous recording of video signals and audio signals, which are not in a synchronous relation with each other, and simultaneous reproduction of both channels if a part of the channel of the audio signals is rerecorded.

The present invention, therefore, provides, in a digital VTR in which digital audio signals of a plurality of channel sampled at a predetermined frequency are recorded on helical tracks on a magnetic recording tape together with digital video signals, a method for recording and reproducing digital audio signals comprising the steps of recording sample number discriminating signals showing a sample number of the audio signals recorded in a frame cycle of the video signals or a cycle having an integer ratio of the video signal frame cycle besides the audio signals of each channel, generating sampling clock pulses or clock pulses having a frequency of an integer multiple of the sampling clock pulses used for reproducing and processing the audio signals by a phase locked loop system comparing a phase of a signal representing a frame cycle of the video signals or a cycle of an integer ratio thereof and a phase of an output signal of a divider of which dividing ratio is varied on the basis of the reproduced sample number discriminating signals, on reproduction, and using clock pulses obtained by reproducing the audio signals and sample discriminating signals thereof which have been recorded as sampling clock pulses or clock pulses having a frequency of an integer multiple of the sampling clock pulses, and recording the reproduced sample discriminating signals as sample discriminating signals, when rerecording a part of channels of the audio signals which have been recorded.

In another aspect of the present invention, the recording is carried out by using clock pulses obtained by reproducing audio signals and sample number discriminating signals thereof of a channel which have been recorded if it is impossible to use the sample discriminating signals of the audio signals of the channel which have been recorded in a same frame as sample number discriminating signals recorded together with audio signals when rerecording a part of the channels of the recorded audio signals, and reproducing and processing are carried out by detecting the sample number discriminating signals of both channels, generating clock pulses having an average sample rate, and controlling adjustment of time axis of the reproduced digital audio signals by a buffer memory, upon reproduction.

The present invention also provides a system for recording and reproducing digital audio signals comprising an encoding means comprising a first switch carrying out switching between output signals of a digital audio interface receiver and output signals of an A/D converter, and a digital audio signal encoder, a phase locked loop generating sampling clock pulses for audio signals from horizontal synchronizing signals of video signals, a crystal oscillator generating sampling clock pulses, independently, a second switch selecting one among output clock pulses of the phase locked loop, the crystal oscillator and a voltage controlled oscillator, a third switch carrying out switching between output clock pulses of the digital audio interface receiver in the encoding means and output clock pulses of the second switch, a recorded sample number discriminating means comprising a first counter and a sample number discriminator, a fourth switch carrying out switching between output signals of the sample number discriminator and output signals of a delay means, a modulating means comprising a multiplexor and a modulator, a demodulating means comprising a demodulator and a demultiplexor, a delay means delaying sample number discriminating signals outputted from the demodulating means a predetermined period of time, a decoding means comprising a digital audio signal decoder, a D/A converter and a digital audio interface transmitter, and a reproduced sampling frequency generating means comprising a second counter, a phase comparator and a low-pass filter.

Still in another aspect of the present invention, the system is further provided with an address controlling part generating address signals on the basis of sample number discriminating signals outputted from the demodulating means and a buffer RAM controlling writing and reading of digital audio signals outputted from the demodulating means in accordance with the address signals.

In according to the present invention, on a normal reproduction, it is possible to reproduce clock pulses suitable to a sample number by varying the sample number of the audio signals recorded in a predetermined cycle of the audio signals so that the video signals and the audio signals in a nonsynchronous relation may be simultaneously recorded. When rerecording a part of the channels of the audio signals which have been recorded, it is possible to coincide a sample number of the audio signals to be recorded in a predetermined cycle of the video signals with a sample number of the recorded channel, thereby simultaneously reproducing the both channels after rerecording.

DETAILED DESCRIPTION OF PREFERRED EMBODIMENTS

Now, a method and a system for recording and reproducing digital audio signals according to the present invention will be described by way of examples, referring to the accompanying drawings.

Figure 1:
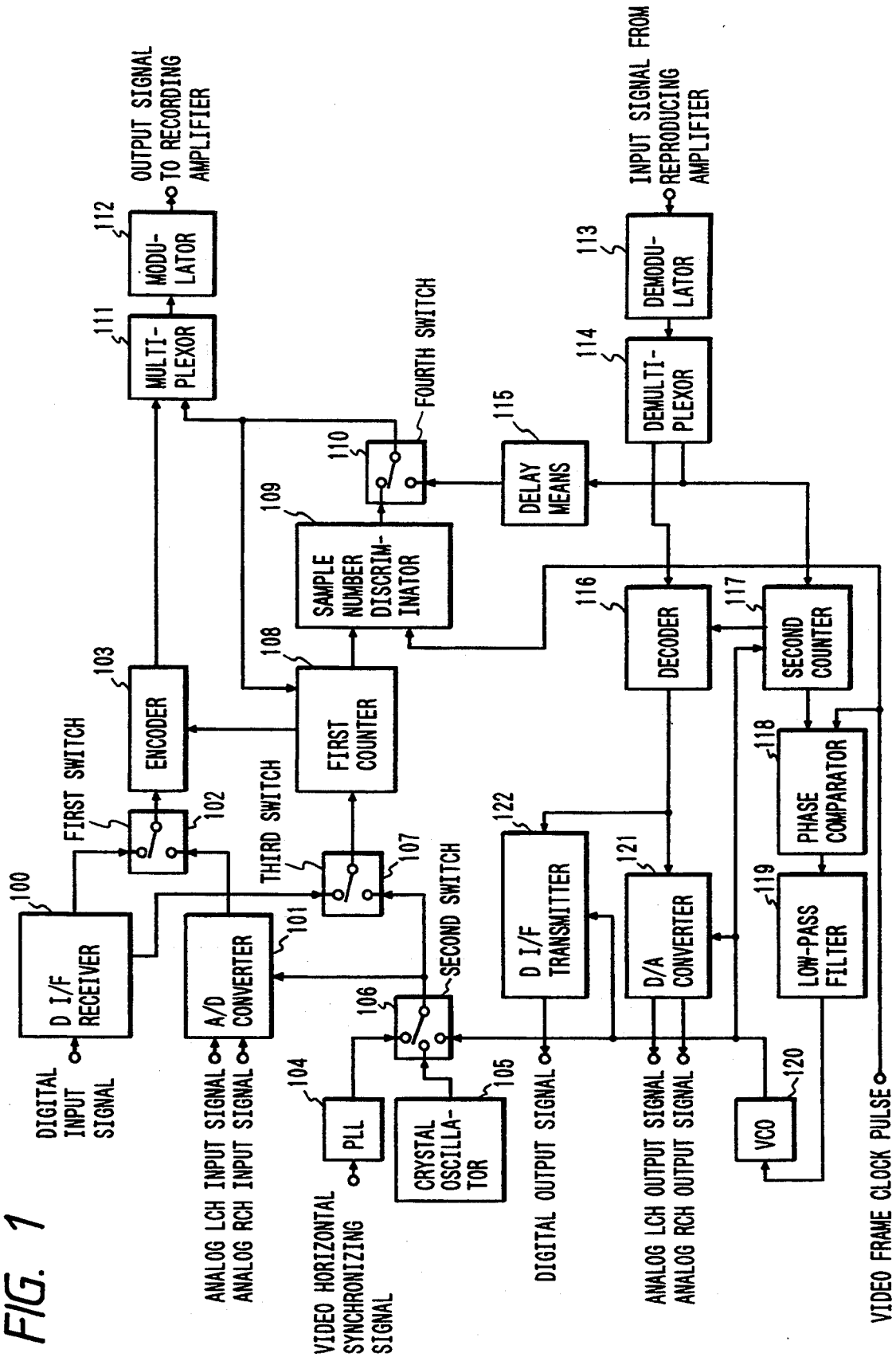
FIG. 1 is a block diagram showing a signal processing system for implementing a method for recording and reproducing digital audio signals of an embodiment according to the present invention.

FIG. 1 shows a block diagram of a signal processing system for implementing a method and a system for recording and reproducing digital audio signals of an embodiment according to this invention.

In FIG. 1, reference numeral 100 denotes a receiver for digital audio interface, 101 an A/D converter, 102 a first switch which carries out switching between output signals of the digital audio interface receiver 100 and output signals of the A/D converter 101, 103 an encoder for digital audio signal data, 104 a PLL which generates clock pulses for sampling audio signals from horizontal synchronizing signals of video signals, 105 a crystal oscillator, 106 a second switch which selects ones among output clock pulses of the PLL 104, output clock pulses of the crystal oscillator 105 and output clock pulses of a voltage controlled oscillator (VCO) 120, 107 a third switch which carries out switching between clock pulses for bi-phase-demodulation outputted by the digital audio interface receiver 100 and output clock pulses of the second switch 106, 108 a first counter which divides output clock pulses of the third switch 107, 109 a sample number discriminator which discriminates a sample number of audio data recorded in one frame cycle of video signals from a count value of the first counter 108 and frame clock pulses of the video signals, 110 a fourth switch which carries out switching between output signals of the sample number discriminator 109 and output signals of a delay means 115, 111 a multiplexor which multiplexes digital audio signals processed by the encoder 103 and output signals of the fourth switch 110, 112 a modulator which modulates output signals of the multiplexor 111, 113 a demodulator, 114 a demultiplexor which separates output signals of the demodulator 113 into digital audio signals and sample number discriminating signals, 115 the delay means which delays the sample number discriminating signals outputted from the demultiplexor 114 a predetermined period of time, 116 a decoder for digital audio signal data, 117 a second counter which divides output clock pulses of the VCO 120, 118 a phase comparator which compare the phase of the load pulses of the second counter 117 with the phase of frame clock pulses of the video signals, 119 a low-pass filter which limits the band of the output signals of the phase comparator 118, 120 the VCO of which oscillated frequency is controlled by output signals of the low-pass filter 119, 121 a D/A converter which converts output signals of the decoder 116 from a digital form into an analog form, and 122 a transmitter which converts output signals of the decoder 116 into digital audio interface signals and transmits them.

Operation of the signal processing system having the above arrangement, implementing a method for recording and reproducing digital audio signals according to the present invention will be described next.

Upon normal recording, the fourth switch selects the output signals of the sample number discriminator 109. In the case of analog input, the first switch selects output signals of the A/D converter 101, and the A/D converter 101 converts analog input signals into digital signals, utilizing output clock pulses of the PLL 104 selected by the second switch 106 or clock pulses having a sampling frequency or a frequency of an integer multiple of the sampling frequency which are output clock pulses of the crystal oscillator 105. The first switch selects output signals of the A/D converter, while the third switch 107 selects output signals of the crystal oscillator 105. In the case of digital input, the digital audio interface receiver 100 performs bi-phase-demodulation on transmitted bi-phase-modulated signals to reproduce both digital audio signals and clock pulses having a sampling frequency and a frequency of an integer multiple of the sampling frequency. The first switch 102 selects digital audio signals outputted from the digital audio interface receiver 100, while the third switch selects clock pulses outputted from the digital audio interface receiver 100. The encoder 103 receives a count value of the first counter 108 which counts output clock pulses of the third switch 107 and performs interleaving, addition of an error correction code and the like on digital signals which are output signals of the first switch 102. The sample number discriminator 109 compares a count value of the first counter 108 with frame clock pulses of the video signals to determine a sample number of the audio signals recorded in one frame cycle of the video signals, and controls loading (or clearing) of the first counter 108. At the same time, the sample number discriminator 109 outputs sample number discriminating signals to the modulator 112 via the multiplexor 111. The multiplexor 111 multiplexes digital audio signal data processed by the encoder 103 and output signals of the sample number discriminator 109. The modulator 112 performs modulation suitable to the recording on output signals of the multiplexor 111, then outputs them to a recording amplifier. Signals for the L channel and signal for the R channel are respectively recorded on different tracks in accordance with a track format shown in FIG. 3, for example.

Upon normal reproduction, input signals from a reproducing amplifier are demodulated by the demodulator 113 and separated into digital audio signals and sample number discriminating signals by the demultiplexor 114. The separated digital audio signals are applied error correction, deinterleaving and the like by the decoder 116 and outputted to both the D/A converter 121 and the digital audio interface transmitter 122. On the other hand, the separated sample number discriminating signals are fed to the second counter 117. The second counter 117 performs load-control on the basis of the sample number discriminating signals. In other words, the second counter 117 counts up to the sample number of digital audio signals recorded in one frame cycle shown by the sample number discriminating signals and, thereafter, loads zero. The phase comparator 118 compares the phase of load pulses of the second counter 117 and the phase of frame clock pulses of the video signals and outputs the result to the low-pass filter 119. The signals of which band is limited by the low-pass filter 119 are inputted to the VCO 120 to control the oscillated frequency of the VCO 120. The digital audio interface transmitter 122 converts digital audio signal data outputted from the decoder 116 into digital audio interface signals by using output clock pulses of the VCO 120, and outputs them. The D/A converter 121 converts digital audio signal data outputted from the decoder 116 from a digital from into an analog form, by using the output clock pulses of the VCO 120.

Next description will be made on operation in case that, in dealt with signals of two channels, R and L, one (the L channel) is first recorded and the other channel, the R channel, is, thereafter, recorded simultaneous with reproduction of the audio signals of the L channel which have been already recorded.

Figure 3:
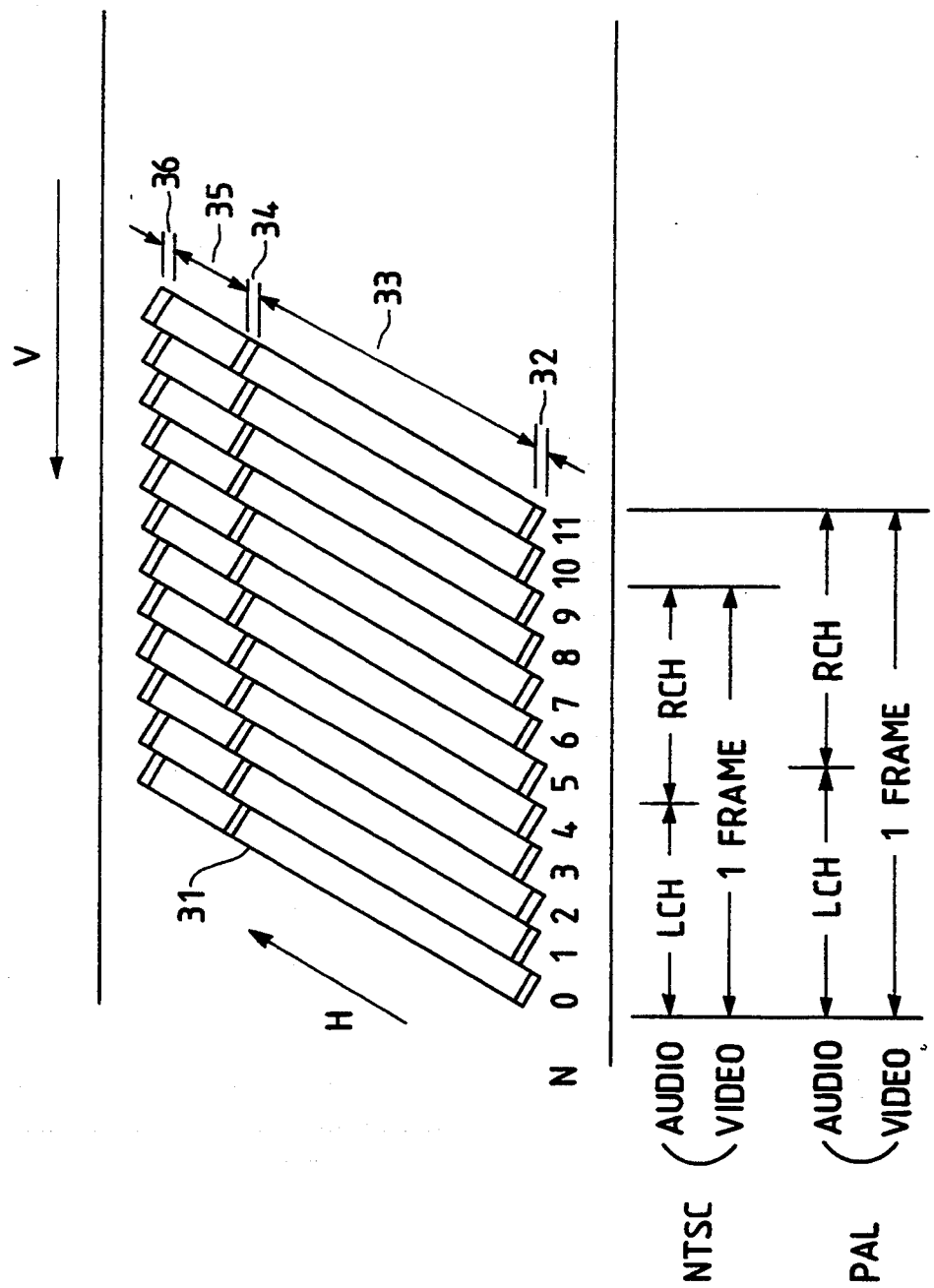
FIG. 3 illustrates a track pattern on a magnetic tape in an embodiment.

FIG. 3 shows a track pattern of an embodiment according to the present invention.

The track pattern shown in FIG. 3, has a number of tracks 31 recorded successively and obliquely along a rotational direction H of a head, The tracks are arranged so as to be inclined with respect to a direction of width of a tape T, and extend in a direction opposite to a traveling direction V of the tape T.

The tracks 31 are given a series of track numbers N per one frame. Each track 31 is provided with regions for a preamble 32, a video signal part 33, an edit gap 34, an audio signal part 35, and a postamble 36, in order, from the head end.

Figure 4:
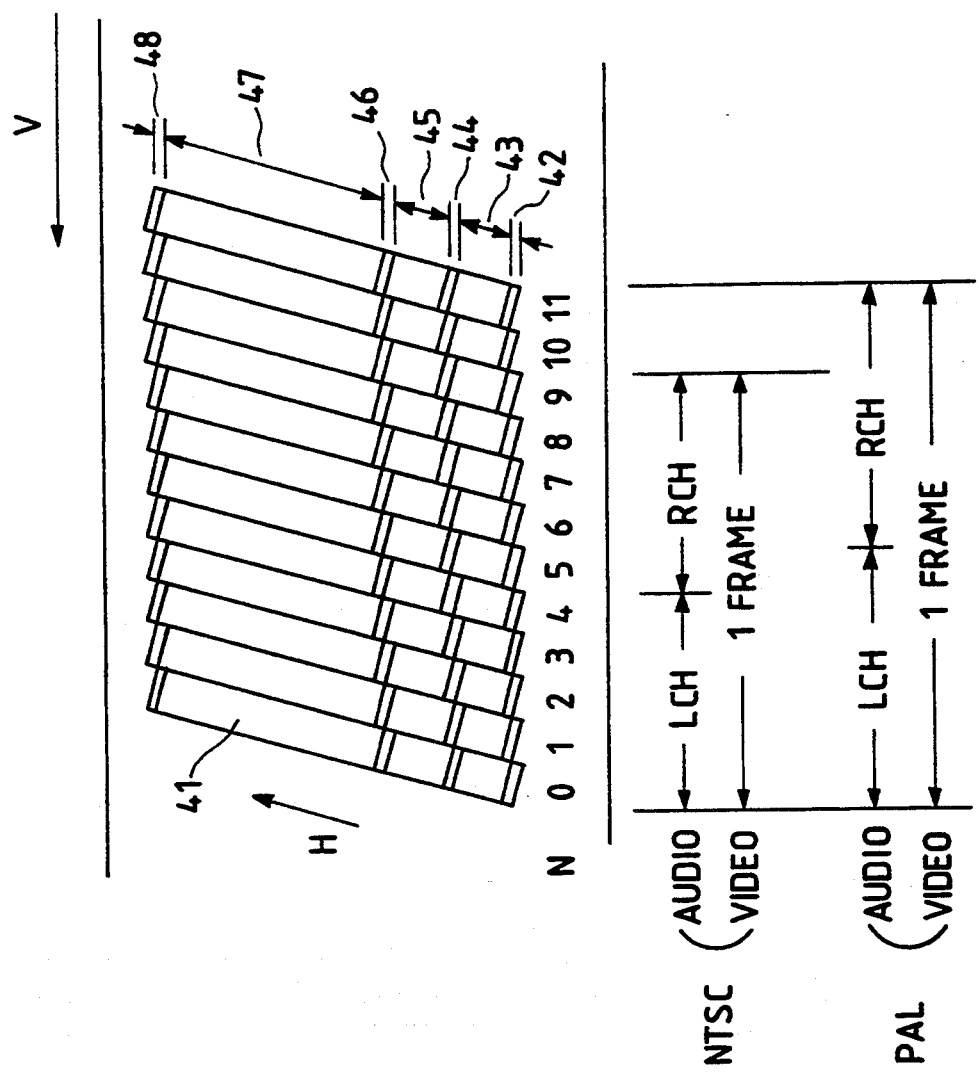
FIG. 4 illustrates another track pattern on a magnetic tape in another embodiment.
Figure 5:
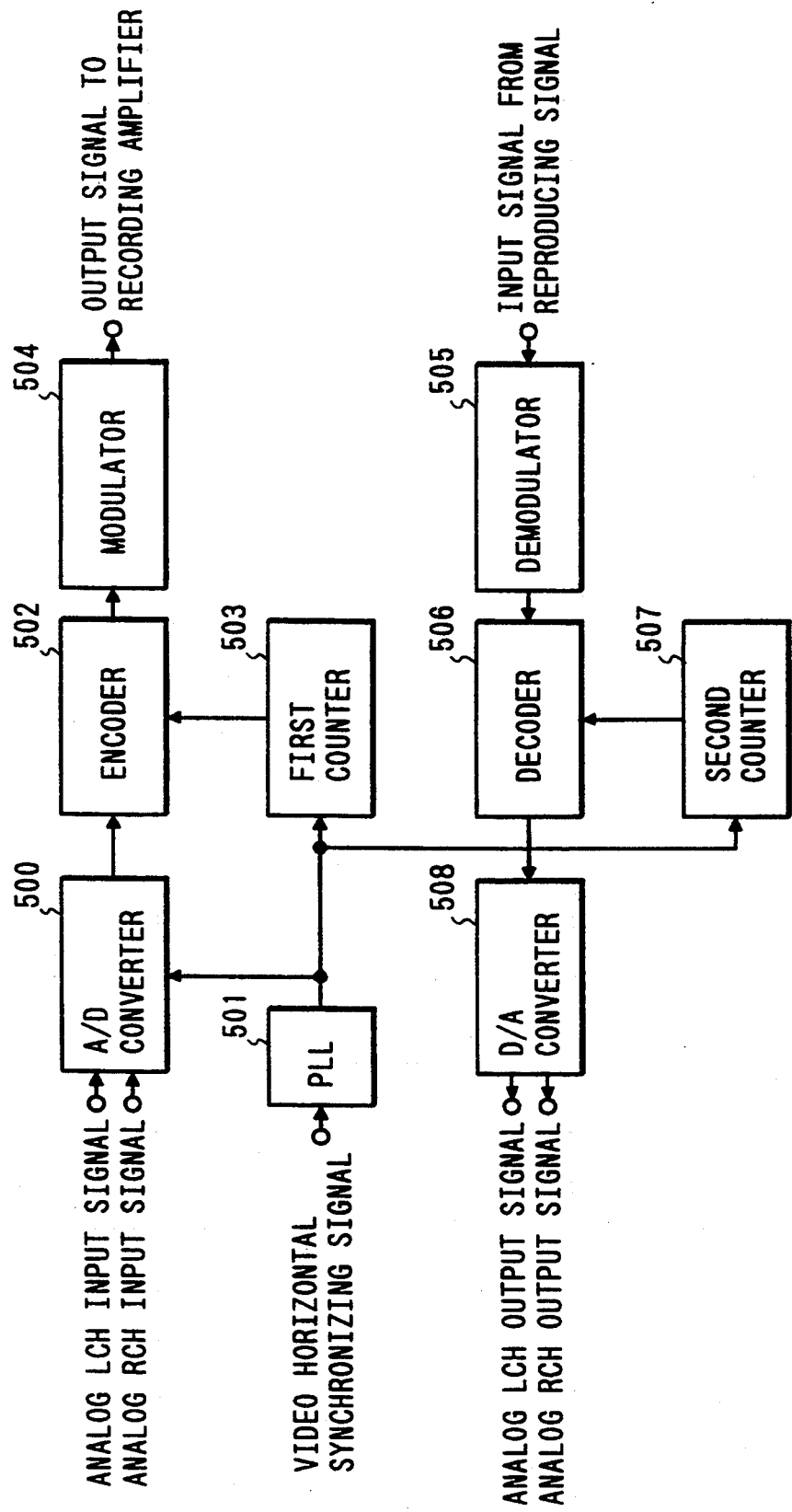
FIG. 5 is a block diagram showing a signal processing system implementing a conventional method for recording and reproducing digital audio signals.
Figure 6:
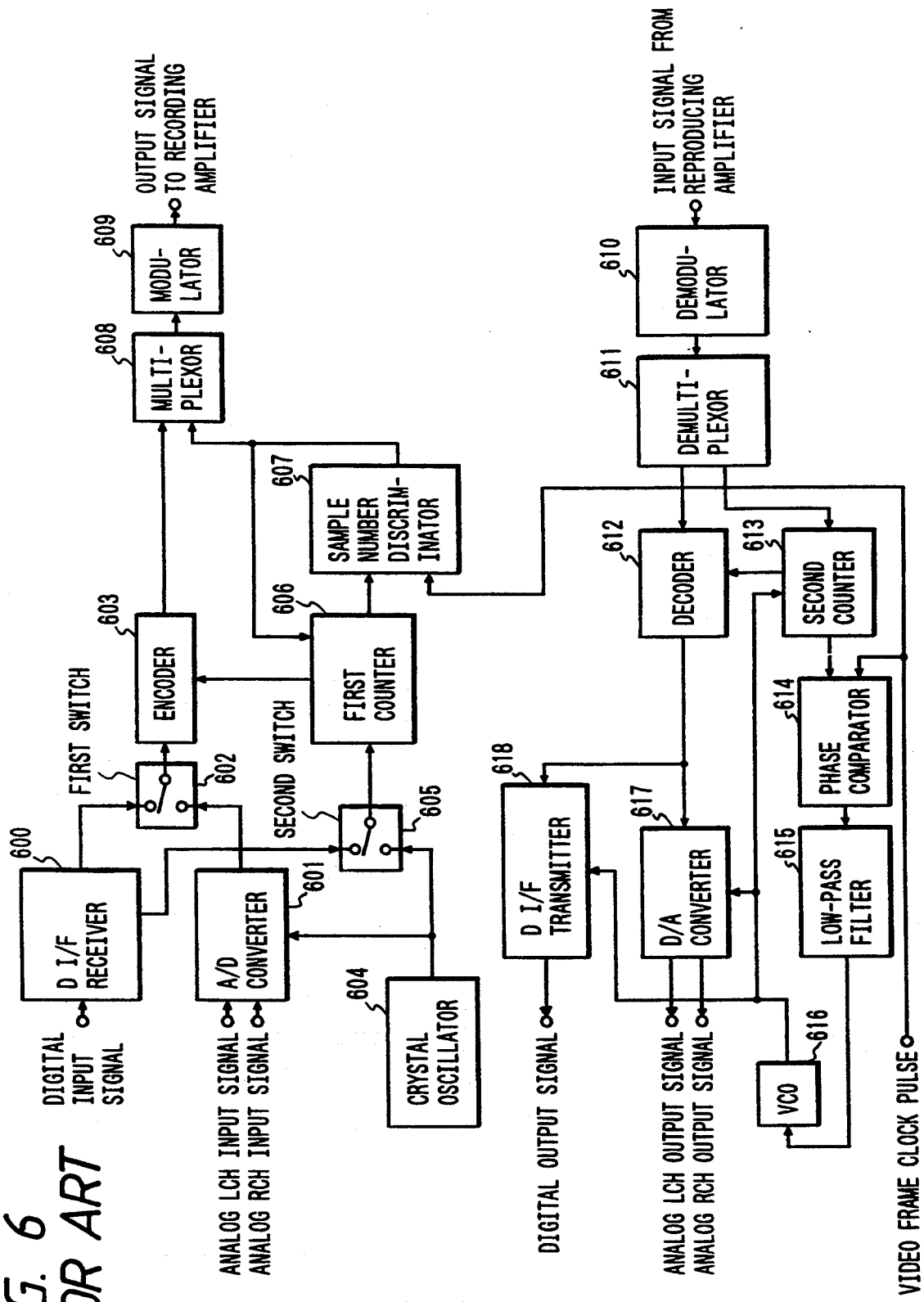
FIG. 6 is a block diagram showing another signal processing system implementing another conventional method for recording and reproducing digital audio signals.

FIG. 4 shows another track pattern of another embodiment according to the present invention.

Each track 41 is provided with regions for a preamble 42, a control signal part 43, an edit gap 44, an audio signal part 45, an edit gap 46, a video signal part 47 and a postamble 48, in order, from the head end.

Incidentally, a number of tracks assigned in one frame is different between in the PAL method and in the NTSC method.

As shown in FIGS. 3 and 4, audio data of the L channel are recorded on the tracks of the first half of the frame and the audio data of the R channel are recorded on the tracks of the latter half of the frame. The audio signals of the L channel are recorded in the first recording. This is carried out in the same manner as in the normal recording, and its operation of the system is also the same in the second conventional example. That is, this recording may be carried out either in analog input or in digital input nonsynchronous with the audio signals.

On recording of the latter half frame of the R channel, the demodulator reproduces the audio signal data and the sample number discriminating signals of the L channel recorded in the first half of the frame. This reproducing operation of the L channel audio signals is the same as the normal reproduction, where clock pulses used for audio signal processing are obtained by comparing the output signals of the counter 117 whose dividing number is varied on the basis of the reproduced sample number discriminating signals with the video frame cycle. In the latter half of the frame, the audio signal data and the sample number discriminating signals of the R channel are outputted from the modulator 112. In the recording of the audio signal data and the sample number discriminating signals of the R channel, the second switch 108 selects the output signals of the VCO, and the fourth switch 110 selects the output signals of the delay means 115. On the other hand, the first switch 102 selects the output signals of the A/D converter 101. Whereby, the sampling frequency for the R channel are brought into synchronization with that for the L channel. The sample number discriminating signals of the audio signals of the L channel reproduced in the first half of the frame are delayed a ½ frame and recorded as the sample number discriminating signals of the R channel so that the sample numbers of both the L and R channel are coincided with each other, thus no problem occurs if the both channels are reproduced simultaneously.

According to the present invention, a switch which can select clock pulses reproduced together with the audio signals as the sampling clock used for recording of the audio signals and a switch which can select the sample number discriminating signals reproduced together with the audio signals as the sample number discriminating signals recorded together with the audio signals are provided, whereby a number of sample data of each of a plurality of channels, being recorded simultaneously, may be coincided with each other even in a system having a simple structure.

Figure 2:
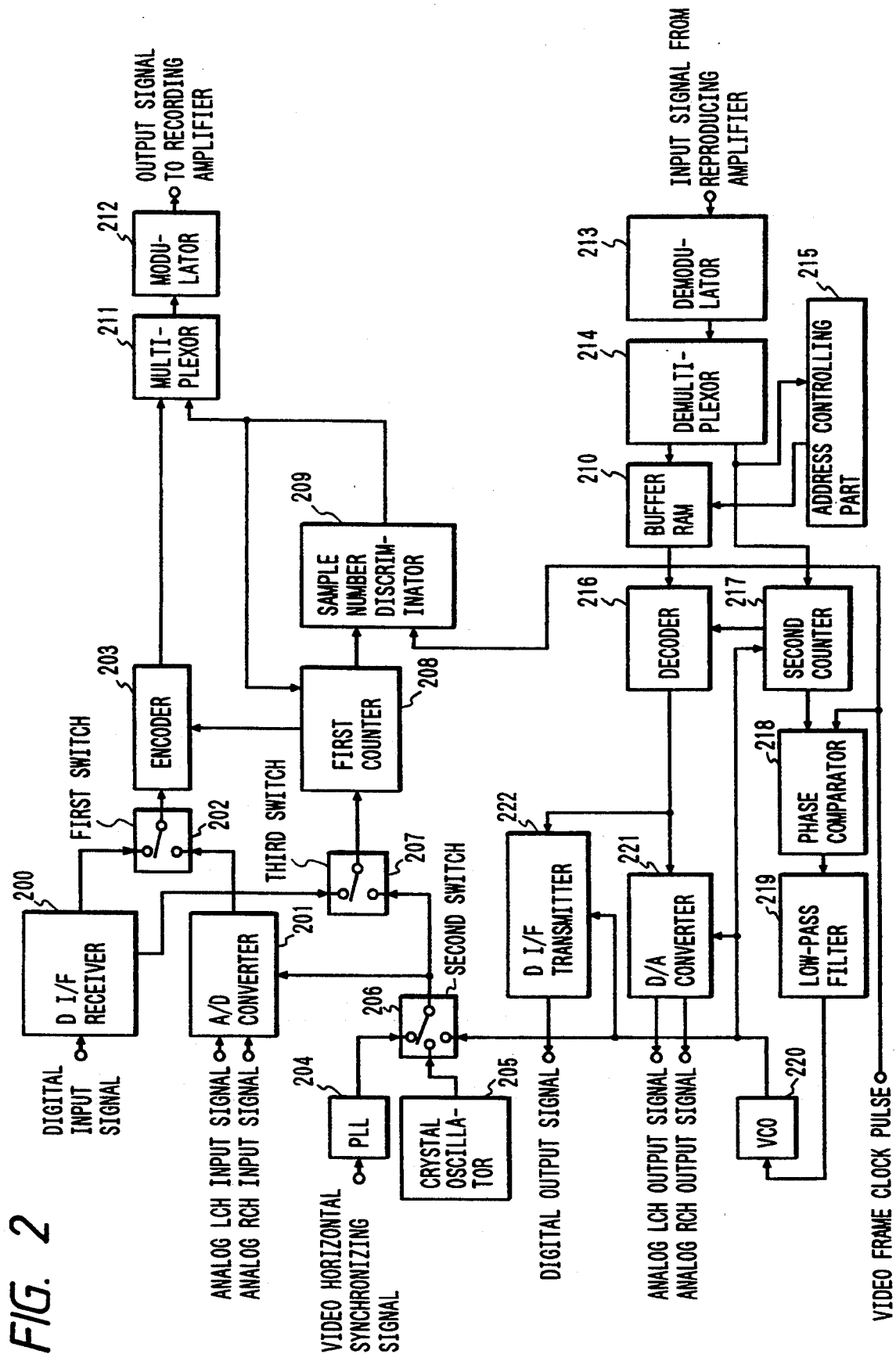
FIG. 2 is a block diagram showing another signal processing system for implementing a the method for recording and reproducing digital audio signals of another embodiment according to the present invention.

Referring now to FIG. 2, there is shown a modified example of the first embodiment shown in FIG. 1, wherein like reference characters (but having a prefix of 2 rather than 1) designate corresponding parts in FIG. 1 except for 210 and 215. In this second example, it is possible to simultaneously reproduce audio signals of a plurality of channels having an equal average sample number employing a D/A converter of a stereo type, although each frame is recorded a different number of sample data.

In FIG. 2, reference numeral 210 denotes a buffer RAM and 215 an address controlling part. The buffer RAM 210 writes and reads audio signal data separated by a demultiplexor 210 according to address generated by the address controlling part 215. The address controlling part 215 generates address to be read out and address to be written according to sample number discriminating signals separated by a demultiplexor 214.

On normal recording, operation of this embodiment is the same as in the first embodiment shown in FIG. 1. In this embodiment, analog input is feasible as well as digital input nonsynchronous with audio signals. For example, in case that after the R channel is recorded, the L channel is recorded at the same time the R channel having been recorded is reproduced, a switch 206 selects outputs of the VCO 220 the same as in the first embodiment shown in FIG. 1 so that recording clock pulses for the L channel becomes equal to reproducing clock pulses for the R channel, and the both channel come to have an equal average rate of the sample number of the audio data recorded in one video frame. However, the sample number recorded in each of the frame is not always coincided with each other.

On reproduction of the signals of the both L and R channels such recorded, if it is detected on the basis of the sample number discriminating signals separated from the audio data by the demultiplexor 214 that a sample number of the L channel signals is larger than a sample number of the R channel signals, the address controlling part 215 generates a larger number of addresses for the L channel to be written in that frame, and if it is detected that a sample number of the R channel is larger than that of the L channel, the address controlling part 215 generates a larger number of addresses for the R channel to be written.

In this way, even if the audio signal sample number for each the channel recorded in the same frame is different from each other, simultaneous recording employing the buffer RAM becomes feasible by making the average rates be coincided with each other.

Although having been described in the case of a manner of L channel recording-R channel reproducing in the above embodiments, it is, of course, possible that this technique is applicable to a monoural two channel, as well as a four channel recording system in which signals of a plurality of channels are compressed and recorded per channel by using a signal compression technique to accomplish rerecording every two channels.

What is claimed is:

1. In a digital VTR in which digital audio signals of a plurality of channels sampled at a predetermined frequency are recorded on helical tracks of a magnetic recording tape together with video signals, the video signals being recorded in predetermined groups of tracks for processing each group of tracks as a unit, a method for recording and reproducing said digital audio signals comprising the steps of:

separately recording the digital audio signals of different channels at different times;

for each channel, at the same time as recording the digital audio signals thereof, recording sample number discriminating signals representing sample numbers of the digital audio signals;

reproducing first clock signals using a digital audio interface for digital input signals;

generating second clock signals using a crystal oscillator;

generating third clock signals using a phase locked loop synchronized with a first synchronizing signal of the recorded video signals;

generating fourth clock signals by comparing a second synchronizing signal for a specific unit of video signals with an output of a divider for a reproduced sample number discriminating signal for audio signals of said unit of video signals;

said second synchronizing signal representing unit timing for each group of tracks of the video signal and being separate from said first synchronizing signal;

switchably selecting from among said first, second, third and fourth clock signals to provide specific clock signals for performing a recording operation, for performing a rerecording operation, and for performing a reproduction operation;

simultaneously reproducing the audio signals of a plurality of channels in synchronism with units of the video signals associated therewith, by detecting said sample number discriminating signals of each of the channels.

2. The method of claim 1, further comprising the step of using said sample number discriminating signals recorded with said digital audio signals of a first of said channels to generate said fourth clock signals, wherein said step of switchably selecting comprises switchably selecting said fourth clock signals to perform, for a specific group of tracks of video signals, an operation of recording a second of said channels of digital audio signals at a time subsequent to recording of said first of said channels of digital audio signals for said specific group of tracks, and recording said second of said channels in said specific group of tracks of video signals with sample number discriminating signals corresponding to the sample number discriminating signals of said first of said channels, thereby to enable simultaneous reproducing of said first and second channels of digital audio signals in synchronism with the video signals of said specific group of tracks.

3. The method of claim 1, wherein said step of switchably selecting comprises switchably selecting among said first, second and third clock signals for initially recording a first channel of digital audio signals, and switchably selecting said fourth clock signal for recording a second channel of digital audio signals after said initial recording of said first channel, and recording said second channel with sample number discriminating signals corresponding to the sample number discriminating signals of said first channel, thereby to enable simultaneous reproducing of said first and second channels of digital audio signals in synchronism with the video signals.

4. In a digital VTR in which digital audio signals of a plurality of channels sampled at a predetermined frequency are recorded on helical tracks of a magnetic recording tape together with video signals, the video signals being recorded in predetermined groups of tracks for processing each group of tracks as a unit, a method for recording and reproducing said digital audio signals comprising the steps of:

recording the digital audio signals of different channels;

for each channel, at the same time as recording the digital audio signals thereof, recording sample number discriminating signals representing sample numbers of the digital audio signals;

reproducing first clock signals using a digital audio interface for digital input signals;

generating second clock signals using a crystal oscillator;

generating third clock signals using a phase locked loop synchronized with a first synchronizing signal of the recorded video signals;

generating fourth clock signals by comparing a second synchronizing signal for a specific unit of video signals with an output of a divider for a reproduced sample number discriminating signal for audio signals of said unit of video signals;

said second synchronizing signal representing unit timing for each group of tracks of the video signal and being separate from said first synchronizing signal;

switchably selecting from among said first, second, third and fourth clock signals to provide specific clock signals for performing a recording operation, for performing a rerecording operation, and for performing a reproduction operation;

reproducing the audio signals of a plurality of channels in synchronism with units of the video signals associated therewith, by detecting said sample number discriminating signals of each of the channels.

5. The method of claim 4, further comprising the step of using said sample number discriminating signals recorded with said digital audio signals of a first of said channels to generate said fourth clock signals, wherein said step of switchably selecting comprises switchably selecting said fourth clock signals to perform, for a specific group of tracks of video signals, an operation of recording a second of said channels of digital audio signals, and recording said second of said channels in said specific group of tracks of video signals with sample number discriminating signals corresponding to the sample number discriminating signals of said first of said channels, thereby to enable reproducing of said first and second channels of digital audio signals in synchronism with the video signals of said specific group of tracks.

6. The method of claim 4, wherein said step of switchably selecting comprises switchably selecting among said first, second and third clock signals for initially recording a first channel of digital audio signals, and switchably selecting said fourth clock signal for recording a second channel of digital audio signals after said initial recording of said first channel, and recording said second channel with sample number discriminating signals corresponding to the sample number discriminating signals of said first channel, thereby to enable reproducing of said first and second channels of digital audio signals in synchronism with the video signals.

* * * * *